No. 625,639. Patented May 23, 1899.
N. L. BURCHELL.
ELECTRICAL SWITCH.
(Application filed Dec. 14, 1898.)
(No Model.) 3 Sheets—Sheet 2.
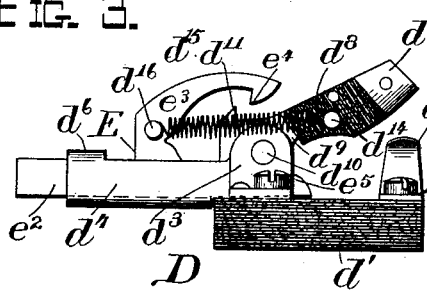
FIG. 3.
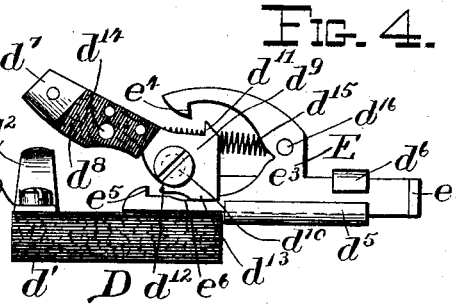
FIG. 4.
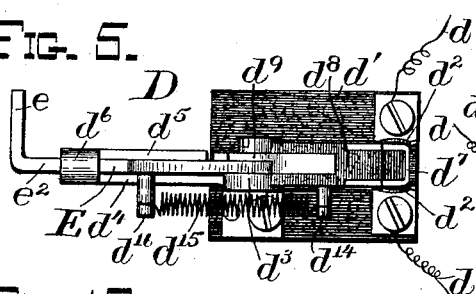
FIG. 5.
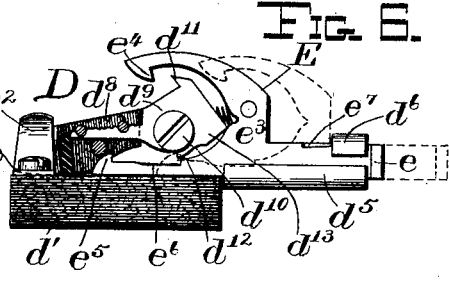
FIG. 6.
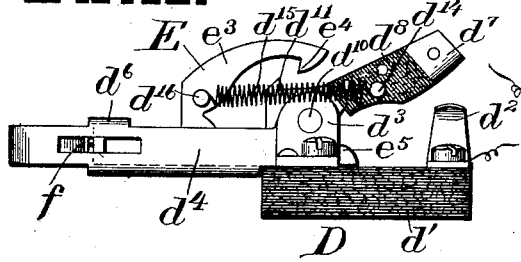
FIG. 10.
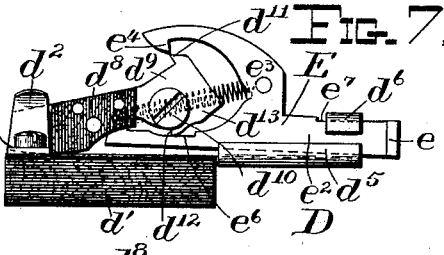
FIG. 7.
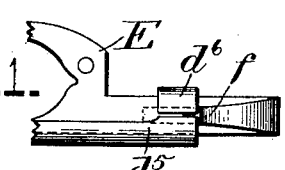
FIG. 11.
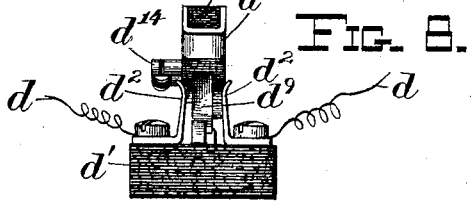
FIG. 8.
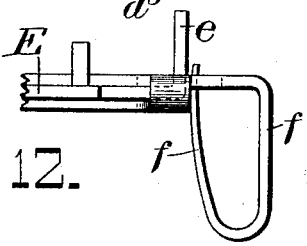
FIG. 12.
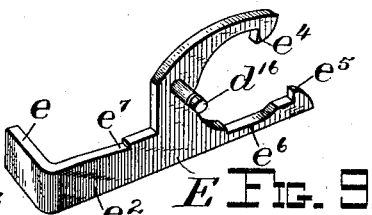
FIG. 9.
FIG. 13.
Witnesses
Percy C. Bowen
John Chalmers Helm
Inventor
N. L. Burchell,
by Wilkinson & Fisher.
Attorneys.
THE NORRIS PETERS CO., PHOTO-LITHO., WASHINGTON, D. C.

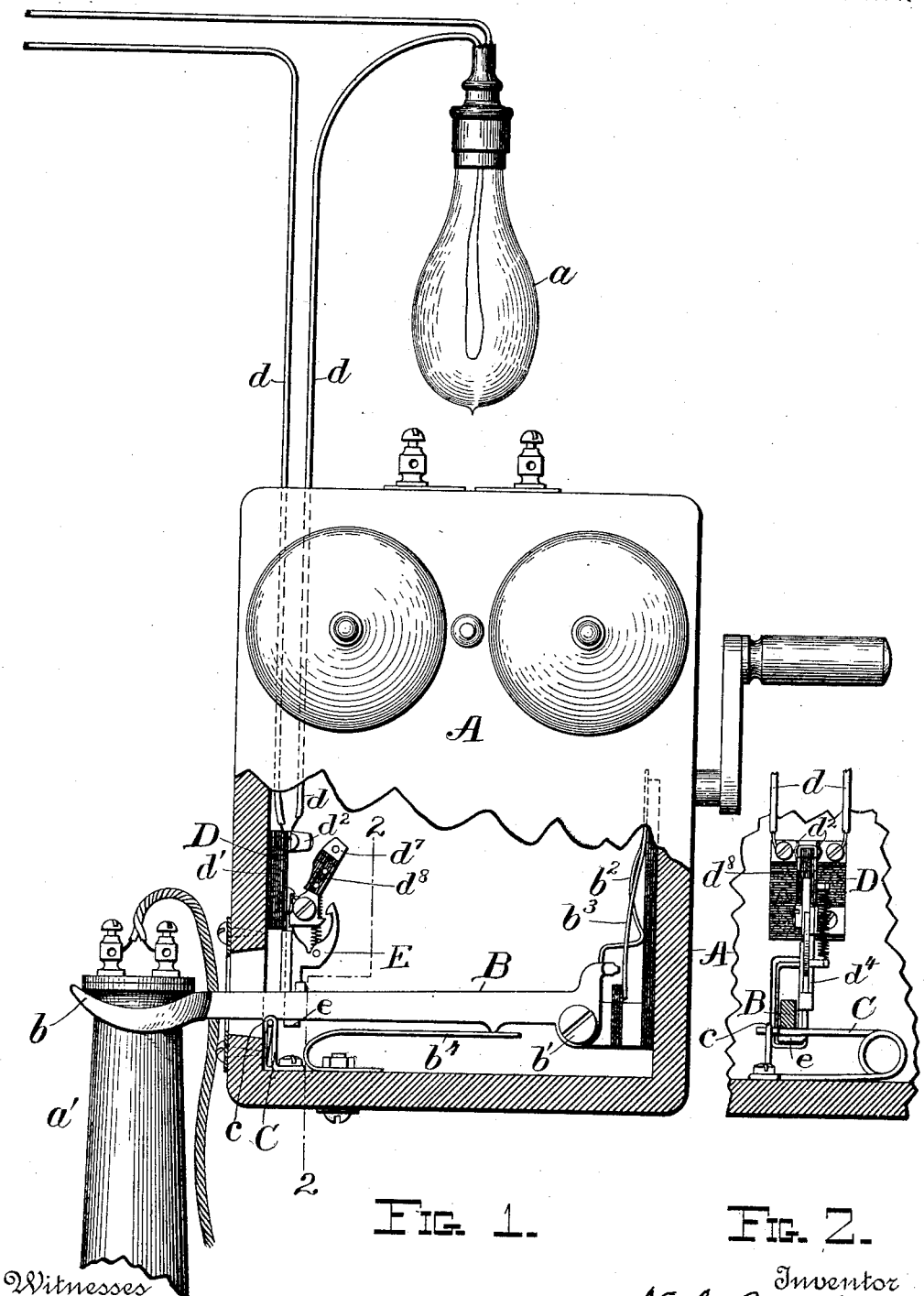

No. 625,639.  
N. L. BURCHELL.  
ELECTRICAL SWITCH.  
(Application filed Dec. 14, 1898.)  
Patented May 23, 1899.
(No Model.)  
3 Sheets—Sheet 3.
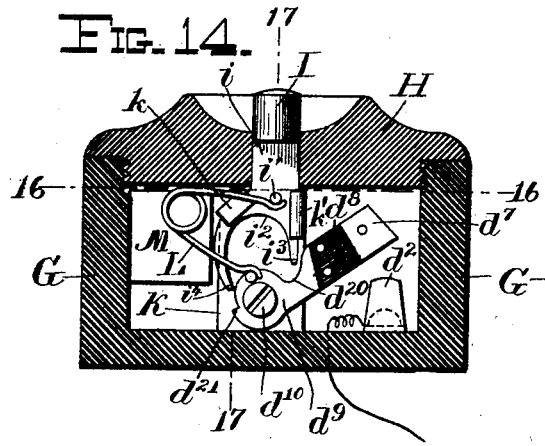
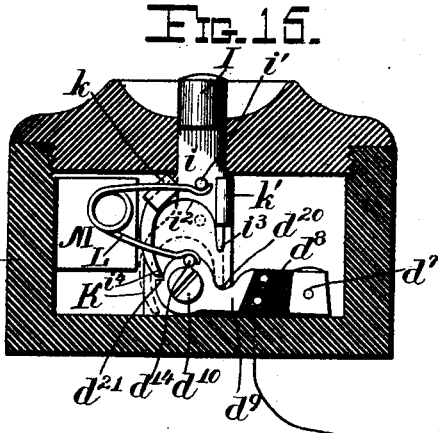
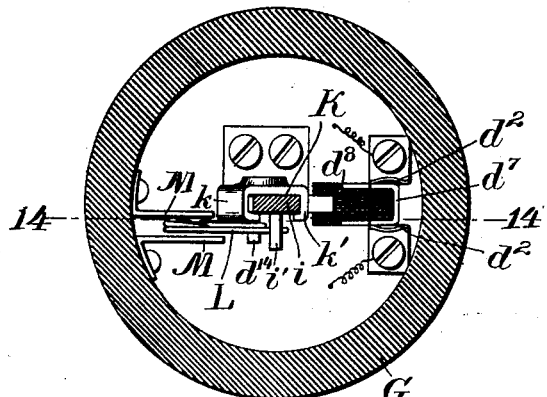
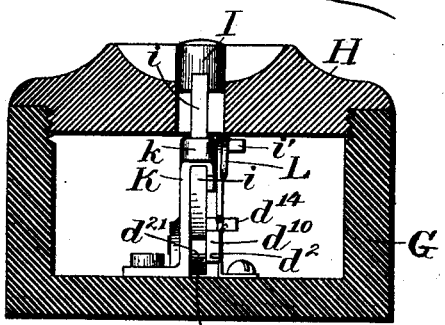
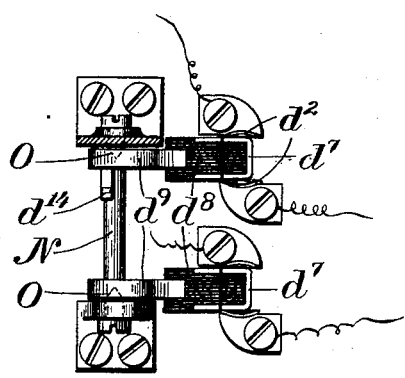
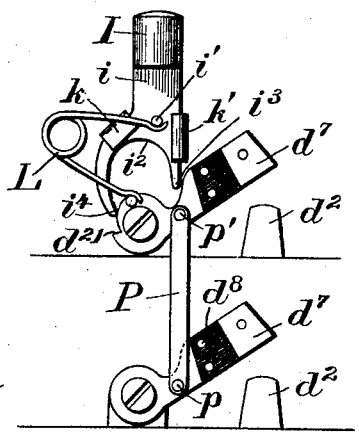
Witnesses  
Percy C. Bowen  
John Chalmers Wilson
Inventor  
N. L. Burchell  
by Wilkinson & Fisher  
Attorneys
THE NORRIS PETERS CO., PHOTO-LITHO., WASHINGTON, D. C.

UNITED STATES PATENT OFFICE.

NORVAL LANDON BURCHELL, OF WASHINGTON, DISTRICT OF COLUMBIA.

ELECTRICAL SWITCH.

SPECIFICATION forming part of Letters Patent No. 625,639, dated May 23, 1899.

Application filed December 14, 1898. Serial No. 699,233. (No model.)

*To all whom it may concern:*

Be it known that I, NORVAL LANDON BURCHELL, a citizen of the United States, residing at Washington, in the District of Columbia, have invented certain new and useful Improvements in Electrical Switches; and I do hereby declare the following to be a full, clear, and exact description of the invention, such as will enable others skilled in the art to which it appertains to make and use the same.

My invention relates to improvements in electric switches; and the object of my invention is to produce a compact and easily-operated switch which is not liable to get out of order, which can be economically manufactured, and which by a straight pull or push will open the circuit and by a continuation of motion in the same direction will close the circuit.

One of the principal uses for which this invention is adapted is in connection with telephones provided with an incandescent light, as set forth in my Patent No. 552,816, dated January 7, 1896. It is obvious, however, that this switch is capable of general application. It may be used in any device where a quick snap action is desired, and besides the particular use set forth in this application it is especially valuable in connection with chandeliers provided with electric lights, and as a shutter photographic apparatus, whether used in taking a time exposure or a snap-shot.

In the accompanying drawings, Figure 1 shows a complete view, partly in section, of a telephonic apparatus provided with an incandescent lamp and with my improved switch. Fig. 2 is a detail cross-section of the same, taken on the line 2 2 of Fig. 1. Fig. 3 is a side elevation of the switch detached, showing it open. Fig. 4 is a similar view taken from the other side. Fig. 5 is a top plan view of the switch. Fig. 6 is a side view with parts broken away, showing the switch closed and showing in dotted lines the movement of the operating-handle. Fig. 7 is a side view of the switch, showing the handle rising as it passes over the upper tooth on the blade of the switch. Fig. 8 is a front view of the switch when opened. Fig. 9 is a detail view of the operating-handle. Fig. 10 is a side view of a modification of the switch. Figs. 11 and 12 are fragmentary side and top views of the same. Fig. 13 shows a modification of the operating-handle. Fig. 14 is a cross-section of a modification of the switch, taken on the line 14 14 of Fig. 16, said switch being adapted to be operated by a push-button instead of a handle and showing the switch open. Fig. 15 is a similar view showing the switch closed. Fig. 16 is a sectional plan looking downward, taken on the line 16 16 of Fig. 14. Fig 17 is a cross-section of the same, taken on the line 17 17 of Fig. 14. Fig. 18 is a top plan view of a modification, showing a two-pole switch; and Fig 19 is a side elevation of parts of a modification of the two-pole switch.

A represents the ordinary receiving-case of a telephone provided with an incandescent lamp $a$ and a receiving-telephone $a'$. It is of the ordinary type, except as hereinafter described. The telephone is supported upon a hook $b$ upon the lever B, pivoted on a pin $b'$, and with the ordinary springs $b^2$, $b^3$, and $b^4$. Near the outer end this lever is supported on a spring C, made of heavy coiled wire. This spring is strong enough to support the weight of the telephone $a'$ under ordinary circumstances in a raised position; but it will, of course, yield to pressure. As shown in Figs. 1 and 2, the spring is secured to the bottom of the telephone-case and bent over upon itself. One end, as at $c$, is bent over into a hook embracing the free end of the spring. The switch D is fastened to the inside of the case just above the lever B. The wires $d$ are connected to the upper part of this switch, and to one of them is attached the lamp $a$. Figs. 3 to 8 show this switch more plainly. It consists of a base $d'$, contact or pole pieces $d^2$, to which the circuit-wires are attached, an upright standard $d^3$, secured to the base, which is prolonged in the rear into a support $d^4$, bent up outside the base, as at $d^5$, and with a clip $d^6$, bent over at the top near the rear. The pieces $d^5$ and $d^6$ furnish supports in which the handle operates. To the upright $d^3$ is pivoted the vibrating switch-blade, which is provided with contact-pieces $d^7$ and insulating material $d^8$, preferably of wood fiber, fastened by rivets to the pivot portion $d^9$, which is secured by a pivot $d^{10}$ to the upright $d^3$. This pivot-piece $d^9$ is approximately square in its general shape and is provided with teeth $d^{11}$ and $d^{12}$ for engagement with the operating-handle and with a flat heel-piece $d^{13}$. It is also provided with a pin $d^{14}$, to which the spring $d^{15}$ is attached, which spring is also attached at the other end to a pin $d^{16}$ upon the operating-handle.

The operating-handle E is shown in perspective in Fig. 9. It is provided with a projection $e$ at the rear for engagement with the telephone-lever B, or if the switch is to be used in other relations—as, for instance, turning on the lights in an electric chandelier—it may be provided with an eye $e'$. (Shown in Fig. 13.) The rear part of the handle is rectangular, as shown at $e^2$, and runs between the guides or supports $d^5$ and $d^6$. The front part is enlarged, as shown at $e^3$; but the main portion of this enlarged part is cut away, leaving two arms, provided with teeth $e^4$ and $e^5$, which are adapted to engage with the teeth $d^{11}$ and $d^{12}$ on the blade of the switch. The lower part of the cut-away portion is still further cut away, as shown at $e^6$, to furnish a bearing for the heel $d^{13}$ of the switch-blade. The upper part of the handle near the rear is provided with a cut-away portion $e^7$, so that the handle when released and when the switch is closed will yield a little and allow the tooth $e^4$ to ride up over the tooth $d^{11}$. After the tooth $e^4$ has passed the tooth $d^{11}$ the spring $d^{15}$ will pull the handle down, so that when it is again retracted the tooth $e^4$ will engage the tooth $d^{11}$. The pin $d^{16}$ is arranged a little higher than the pin $d^{14}$ when the switch is in the closed position, and at the same time the pin $d^{14}$ is lower than the pivot $d^{10}$, so that the force of the spring $d^{15}$ tends also to hold the switch closed.

The operation of the switch is as follows: When the handle E is drawn back, the tooth $e^4$ will engage the tooth $d^{11}$, raising the switch-blade and at the same time raising the pin $d^{14}$. As soon as the pin $d^{14}$ is raised above the line connecting the pin $d^{16}$ with the pivot $d^{10}$ the spring $d^{15}$ quickly draws the blade back until the heel $d^{13}$ comes in contact with the shoulder at the rear of the cut-away portion $e^6$ of the operating-handle. The switch is then held in an open position if the operation is arrested. A further pull causes the tooth $e^5$ to engage with the tooth $d^{12}$, closing the switch. When the handle is then released, the spring $d^{15}$ brings it back until the tooth $e^4$ strikes the tooth $d^{11}$, when the handle rides up over the blade until the tooth $e^4$ has passed the tooth $d^{11}$, when the handle falls into its original position. Thus it will be seen that a straight pull first opens the switch and a second pull in the same direction closes it, and when the handle is released after the switch is closed the handle flies back and the parts are in the original closed position. The operation of this switch when applied to a telephone is shown in Figs. 1 and 2.

When the telephone $a'$ is not in use, it is hung upon the lever B. The lever is thus drawn down until it occupies the position shown in Fig. 1, resting upon the spring C. This downward movement (the projection $e$ being in contact with the lever B) opens the switch and puts out the lamp. If a person desires to use the phone in the daytime or when there is no need of the lamp, he simply uses the phone in the usual way and the lamp is not lighted, the heel-piece $d^{13}$ by its engagement with the shoulder at the rear of the flat portion $e^6$ of the handle preventing the handle from being drawn back by the spring, in which event no part of the switch need be in action. If, however, he desires to use the lamp, before taking the telephone off the hook he gives a slight pull downward. This draws the operating-handle E still farther down against the tension of the spring C, closes the switch, and lights the lamp.

When the operator has finished using the telephone, he simply hangs it up on the hook $b$. This pulls the lever down until it strikes the spring C, thus opening the switch and putting out the lamp. Thus it will be seen that the operations differ in no way from the usual operation of a telephone, except that when the operator desires to use the lamp he gives the telephone a slight downward pull before he takes it off the hook.

In Figs. 10, 11, and 12 a modification is shown, in which an additional spring is provided. This spring $f$ acts as a buffer. It is so placed that its pressure will begin to be felt at that point when the handle has been withdrawn far enough to open the switch. The primary use of this spring is to indicate the point at which the switch has been opened. It therefore takes the place of the spring C in Fig. 1.

The construction covered by Figs. 10, 11, and 12 shows that the spring and switch may be made as one structure. Figs. 14 to 19 show switches embodying the same general principle of construction, but operated by a push-button instead of a handle. G represents a casing, preferably circular in form, into which is screwed a cap H, provided with an aperture for the push-button I. The common pole-pieces $d^2$ are used, and the blade of the switch is constructed with parts $d^7$, $d^8$, and $d^9$, already described. A support K is fastened to the bottom of the casing G and extends upward, being bent over to form extensions $k$ and $k'$, which embrace the flattened portion $i$ of the push-button. The blade of the switch is pivoted at $d^{10}$ in the support K and is provided with a pin $d^{14}$. The push-button is also provided with a pin $i'$, and engaging the pins $d^{14}$ and $i'$ is the spring L, which continually tends to throw the push-button outward. The blade of the switch is cut away on the side of the pivot next to the poles, forming a recess $d^{20}$. On the switch-blade, on the other side of the pivot, is a tooth $d^{21}$. The lower end of the push-button is enlarged. This enlarged portion is cut away at $i^2$, forming teeth or projections $i^3$ and $i^4$. The spring L is held in position by two plates M, attached to the side of the casing G, although it is obvious that any other suitable means of holding the spring in place might be used.

The operation of the switch shown in Figs. 14 to 17 is as follows: The switch being in the position shown in Fig. 15, a downward or inward pressure of the button brings the tooth $i^4$ into contact with the tooth $d^{21}$ and throws the switch into the position shown in Fig. 14, thereby opening it. If pressure is withdrawn from the button at this time, the spring L holds the switch in the position shown in Fig. 14—that is to say, in its open position—the position of the pins $i'$ and $d^{14}$ in relation to the pivot $d^{10}$ being the same as has already been described in connection with the pins $d^{14}$ and $d^{16}$ and pivot $d^{10}$ in the form shown in Figs. 3 to 13. A still further pressure causes the tooth $i^4$ to pass the tooth $d^{21}$, as shown in dotted lines in Fig. 15, and the tooth $i^3$ then comes in contact with the blade of the switch in the depression $d^{20}$ and throws the switch down into the position shown in Fig. 15, again closing the switch. In other words, a straight pressure first opens, and a second pressure in the same direction closes, the switch.

In Fig. 18 is shown a switch of the same principle, except that two poles are used instead of one. Two switch-blades are used, suitably mounted upon an axle N, supported upon points O, secured in extensions mounted on the bottom of the casing. The operation of the switch is identical with that already described.

In Fig. 19 is shown a still further modification of the two-pole switch, in which one switch-blade is mounted directly over the other. The upper switch-blade operates the lower switch-blade by means of a link P, pivoted at $p$ and $p'$ to the switch-blades, respectively. The operation of this switch is also identical with the operation already described.

It is obvious that many modifications might be made without departing from the spirit of my invention, the main feature of which is a switch so arranged that it may be operated to be opened or closed by a straight pull or push. I wish it, therefore, to be expressly understood that I do not limit myself to the exact details shown and described.

Having thus described my invention, what I claim as new, and desire to secure by Letters Patent of the United States, is—

1. In an electric switch, the combination of a pole-piece, a switch-blade and operating means therefor, the parts being so arranged that the switch may be opened and locked by a straight pull or push and then closed by a continuation of the motion in the same direction, substantially as described.

2. In an electric switch the combination of a pole-piece, a pivoted switch-blade, a spring and operating means, the parts being so arranged that the switch may be opened and locked by a straight pull or push and then closed by a continuation of the motion in the same direction, substantially as described.

3. In an electric switch, the combination of a pole-piece, a pivoted switch-blade provided with portions adapted to engage with the means for operating said blade, said operating means, which are also provided with projections, and a spring engaging said switch-blade and said operating means, the parts being so arranged that a straight pull or push will open and close the switch, whereby the switch may be opened by a straight pull or push and then closed by a continuation of the motion in the same direction, substantially as described.

4. In an electric switch, the combination of a base-plate, pole-pieces thereon, a switch-blade pivotally supported on said base-plate, said switch-blade being provided with teeth, operating means therefor provided with teeth, said teeth being adapted to engage the teeth upon the switch-blade, and a spring connected to said switch-blade and said operating means, the parts being so arranged that a straight pull or push will open and close the switch, whereby the switch may be opened by a straight pull or push and then closed by a continuation of the motion in the same direction, substantially as described.

5. In an electric switch, the combination of a base-plate, pole-pieces thereon, a support mounted on said base-plate, a switch-blade pivotally mounted on said support and provided with teeth, an operating-handle also provided with teeth, and a spring connected to said handle and to said switch-blade, the parts being so arranged that a straight pull or push will open and close the switch, whereby the switch may be opened by a straight pull or push and then closed by a continuation of the motion in the same direction, substantially as described.

6. In an electric switch, the combination of a base-plate, a pole-piece thereon, a support fastened to said base-plate, a switch-blade pivoted on said support and provided with teeth arranged on opposite sides of the pivot, an operating-handle provided with a central cut-away portion at one end, said cut-away portion being adapted to pass over one end of the switch-blade, teeth on the handle adapted to engage the teeth upon the pivoted switch-blade, and a spring connected to said handle and to said switch-blade, substantially as described.

7. In an electric switch, the combination of a base-plate, pole-pieces thereon, a support fastened to said base-plate and prolonged to the rear, a switch-blade pivotally mounted on said support, the rear end of said switch-blade being provided with teeth arranged on opposite sides of said pivot and with a flat heel-piece and an operating-handle therefor provided with a cut-away portion near one end forming arms which extend over the rear of the switch-blade, and which are provided with teeth at their ends, said cut-away portion of the handle being also provided with a flat portion adapted to engage the heel of the switch-blade, and a spring connected to said handle and to said switch-blade, substantially as described.

8. In an electric switch, the combination of a base-plate, a pole-piece thereon, a support fastened to said base-plate having a rearward extension provided with bent-over portions, a switch-blade pivotally mounted on said support, the rear end of the switch-blade being provided with teeth arranged on opposite sides of the pivot, and an operating-handle, one end of which is cut away forming arms adapted to extend over the rear part of the switch-blade, said arms being provided with teeth, said handle being provided with a cut-away portion on its top near the rear to permit the outer tooth of the handle to ride up over the outer tooth of the switch-blade, and a spring connected to said handle and to said switch-blade, substantially as described.

9. In an electric switch, the combination of a base-plate, a pole-piece thereon, a support attached to said base-plate and provided with a rearward extension which is in turn provided with bent-over portions to support the handle, a switch-blade pivotally mounted on said support, the rear end of said blade being provided with teeth arranged on opposite sides of the pivot and with a flat heel-piece, an operating-handle adapted to slide in said support, said handle being provided with a cut-away portion near one end forming two arms, one of which is longer than the other, and each of which is provided with a tooth at its outer extremity, one of said arms being provided with a flat piece to engage the heel upon the switch-blade, the upper and rear part of the handle being cut away, and a spring connected to said handle and to said switch-blade, substantially as described.

10. In an electric switch, a switch-blade provided with a contact-piece at or near one end, insulating material in engagement with said contact-piece and a rearward-operating portion provided with oppositely-arranged, forwardly-projecting teeth and a flat heel located between said teeth, substantially as described.

11. In an electric switch, an operating-handle composed of a straight bar with an enlargement at one end, said enlargement being cut away so as to form two arms, each of which is provided with a tooth, the lower arm being provided with a flattened portion on its inner side, substantially as described.

12. In an electric switch, an operating-handle composed of a straight bar bent substantially at right angles at the rear end, and provided with a cut-away portion on its upper side near said end, and with an extension at the other end, said extension being cut away forming two arms, one of which is longer than the other, and each of which is provided with a tooth, the lower arm being provided with a flattened portion on its inner side, and a pin attached to said extension, substantially as described.

13. The combination of a telephone, a pivoted supporting-lever therefor and an electric switch provided with a part engaging said lever, the parts being so arranged that the weight of the receiver will open said switch and a sufficient pull in the same direction will close said switch, substantially as described.

14. The combination of a telephone-case, a telephone, a lever pivoted in said case and adapted to support the telephone when not in use, a spring on which said lever rests near one end, and an electric switch, the handle of which engages with said lever, the parts being so arranged that under ordinary conditions the weight of the telephone will pull down the lever until it strikes the spring thereby opening the switch, and so that a downward pull upon the lever will compress the spring and close the switch, substantially as described.

15. The combination of a telephone-case, a pivoted lever therein provided with a hook, a telephone adapted to be supported on said hook near one end, a pivoted switch provided with a toothed operating-handle and a pivoted switch-blade, the parts being so arranged that a sufficiently-strong downward pull upon the operating-lever will open and close the switch, substantially as described.

16. The combination of a telephone-case, a lever pivoted therein and provided with a hook, a telephone adapted to be supported on said hook, a spring attached to said case and supporting the outer end of said pivoted lever, a switch attached to said case the handle of which is adapted to engage said pivoted lever, a circuit containing an electric lamp, said switch being provided with a pole-piece, a pivoted switch-blade provided with teeth, an operating-handle provided with toothed arms, and a spring connecting said handle and said switch-blade, whereby the switch may be opened by a straight pull or push and then closed by a continuation of the motion in the same direction, substantially as described.

17. The combination of a telephone-case, a pivoted lever therein provided with a hook, a telephone adapted to be supported on said hook, a spring supporting said lever near its outer end, a circuit provided with an electric lamp, a switch provided with pole-pieces engaging the wires of said circuit, a pivoted switch-blade provided with teeth at its rear, an operating-handle engaging said lever and provided with tooth-arms adapted to engage the teeth on said switch-blade, one of said arms being longer than the other, and a spring connecting said handle and said switch-blade, substantially as described.

18. The combination of a telephone-case, a pivoted lever therein provided with a hook, a telephone adapted to rest upon said hook, a spring supporting the outer end of said lever, an electric circuit containing a lamp and an electric switch provided with pole-pieces engaging the wires of said circuit, a pivoted switch-blade provided with teeth arranged on opposite sides of the pivot and with a flat heel, an operating-handle therefor provided with a bent portion engaging said lever and provided with toothed arms, one of which is longer than the other and with a flat portion in one of said arms adapted to engage the heel on said switch-blade, said handle being provided with a cut-away portion near one end, a spring connected to said switch and to said handle, and a support for said handle and said switch-blade, substantially as described.

In testimony whereof I affix my signature in presence of two witnesses.

NORVAL LANDON BURCHELL.

Witnesses:
JOHN H. HOLT,
J. STEPHEN GIUSTA.